United States Patent Office 3,125,421
Patented Mar. 17, 1964

---

3,125,421
CERIUM MONOSULFIDE ARTICLES
Donald H. Hollingsworth, Jr., Bay Village, Ohio, Adger S. Johnson, Englewood, N.J., and Lawrence M. Litz, Lakewood, and Rudolph W. Oliver, Cleveland, Ohio, assignors to Union Carbide Corporation, a corporation of New York
No Drawing. Filed June 1, 1960, Ser. No. 33,106
11 Claims. (Cl. 29—183.5)

This invention relates to cerium monosulfide articles and it more particularly relates to such articles having an oxidation-resistant coating thereon.

Cerium monosulfide has become an extremely useful material particularly in the hollow casting field. Because of its unique combination of physical and chemical properties; of being highly refractory, having good dimensional stability at very high temperatures, resistance to attack by certain chemicals, electrical resistance, and solubility in many dilute acids, this material is very well adapted to use as a fugitive core for metallic castings, in particular turbine blades. Despite all of the desirable properties of cerium monosulfide, its use in many fields is hampered by the fact that it is subject to rapid oxidation at high temperatures. This condition may be aggravated by the application of uneven heating to an article of cerium monosulfide thus sometimes causing it to crack, break, or otherwise deform due primarily to the brittleness caused by the oxidation. Another detrimental factor is that cerium monosulfide tends to hydrolyze under certain atmospheric conditions thereby preventing storage of articles of such material for a prolonged period without proper atmospheric control. Because of these factors, cerium monosulfide has often been stored in hermetically sealed containers under inert atmospheres. As is well understood, this is a cumbersome and expensive procedure and should be avoided if at all possible.

It is therefore the principal object of this invention to provide an article which comprises cerium monosulfide that is resistant to oxidation and hydrolysis.

It is another object of this invention to provide an article, which comprises cerium monosulfide, that is stronger than those heretofore made.

Fulfilling these objects, this invention resides in an article comprising cerium monosulfide having a very thin coating of a refractory metal thereon.

Cerium monosulfide articles made by any of the commonly used methods or by any of the newer processes are adapted to use in this invention. Besides hot and cold pressing, sintering and extrusion, one of the best ways found to make cerium monosulfide articles is to prepare a slurry comprising a liquid cementing material, a solvent for said cement, and fine particle size cerium monosulfide. A suitably shaped wire is dipped into this slurry and a certain amount of cerium monosulfide adheres thereto. This wire with adhering cerium monosulfide is then dried and sintered to form a relatively solid article. This process may be repeated as many times as desired to produce an article of the desired dimensions. While the wire may be of substantially any material which does not react with or dissolve in the slurry thus formed, it is preferred to use either tungsten or molybdenum.

A cerium monosulfide article which has been made by any of the techniques disclosed above may be coated with a layer of material intended to protect the cerium monosulfide from oxidation or hydrolysis upon contact with air or moisture. This procedure is particularly advantageous when dimensional tolerance and impurity concentrations must be strictly adhered to.

It has been found by testing samples of cerium monosulfide, coated with various thicknesses of refractory metal, that a coating which is as thin as 0.0015 inch serves to enhance the strength characteristics of the article to an extent wholly inconsistent with the minor amount of metal in the coating. It has been further found that this minor amount of metal imparts substantial oxidation-resistance to the article. It is preferred, however, to place at least a 0.004 inch coating on a cerium monosulfide article in order to assure oxidation resistance and additional strength.

There are many very well-known and documented methods of providing a coating of one material on another. Among the most useful of these methods are: electroplating, painting, spraying, decomposition of metal carbonyls, vacuum metallizing, drawing a metal tube filled with the material to be clad to a reduced diameter, and many other similar methods well known in the coating art. A large variety of metals may be used to coat cerium monosulfide to provide the oxidation resistance and added strength referred to above. Some of the more useful of these metals are: nickel, chromium, iron, cobalt, gold, zirconium, platinum, and many alloys of these and other elements, particularly the special heat resistant nickel base alloys.

While cerium monosulfide articles having a coating of refractory metal thereon may be used in a variety of ways, the particular application best suited to articles made according to this invention is fugitive cores for hollow foundry castings. In particular, this use has application in the field of fabrication of channeled turbine blades. When used for this purpose, a maximum limitation must be placed on the thickness of the metal coating applied to the cerium monosulfide article. This limitation may be best expressed by saying that the coating must contain no more metal than could be tolerated in solution in the casting being fabricated.

When making a hollow or channelled casting, the metal to be cast about the coated cerium monosulfide core will dissolve at least some and probably all the material clad on the cerium monosulfide core. For this reason, it is desirable to employ a cladding on cerium monosulfide articles which is preferably the same as the metal to be cast, or is at least compatible with this metal. When the fugitive cerium monosulfide core is removed, the metal which was clad to it will form an integral part of the finished casting. The above limitations recited as to the thickness and composition of the coating are therefore very important when the cerium monosulfide articles are to be used for this purpose.

The following may be cited as a specific example of one method of applying a refractory metal coating on a cerium monosulfide article:

A cerium monosulfide rod 0.054 inch in diameter having a 0.01 inch diameter tungsten wire through the axis thereof was placed in an air-tight container. The atmosphere of the container was adjusted to contain 80% carbon monoxide and 20% nickel carbonyl. A current sufficient to produce a power input of 10 to 15 watts was applied to the article through the tungsten wire for 1.5 hours. During this time, a nickel coating uniformly 0.005 to 0.007 inch thick was deposited on all exposed parts of the article. This coated article was then tested and found to be resistant to oxidation even when heated for 4 hours in air at temperatures as high as 1000° C. By comparison, an unclad cerium monosulfide rod subjected to the same conditions was destroyed in a few minutes.

Other coated cerium monosulfide articles were prepared by filling a tube of the appropriate metal with powdered cerium monosulfide and drawing the tube to an extent sufficient to produce the desired diameter of cerium monosulfide and the desired wall thickness (amount of coated metal). Table I, below, shows data taken from a number of such coatings performed with various metal tubes. The term nickel or "nickel alloys" which appears in the table is intended to encompass heat-resistant nickel base alloys, most of which are very well known to the art. These materials are exemplified by those generally sold under the trade names "Inconel," "Monel," and "Hastelloy."

*Table I*

| Tube metal | Original outside diameter inch | Final inside diameter inch | Final wall thickness inch |
|---|---|---|---|
| Nickel alloy | 0.405 | 0.110 | 0.0365 |
| Do | 0.405 | 0.087 | 0.0285 |
| Do | 0.405 | 0.0625 | 0.0210 |
| Do | 0.405 | 0.0231 | 0.0087 |
| Do | 0.405 | 0.0173 | 0.0065 |
| Do | 0.405 | 0.0148 | 0.0051 |
| Do | 0.405 | 0.0203 | 0.00409 |
| Do | 0.125 | 0.062 | 0.0185 |
| Zirconium | 0.304 | 0.252 | 0.051 |

The data presented in this table and in the above disclosed specific example indicate some of the materials adapted to be clad on cerium monosulfide articles and some of the coating thicknesses which have been prepared in individual test runs. In each case, the resultant coated article proved to be resistant to air oxidation at high temperatures, thus allowing the articles to be stored in conventional manner and used without undue atmospheric control. Additionally, all the articles so produced exhibited increased strength and resistance to breakage and wear.

What is claimed is:

1. An article comprising cerium monosulfide which is clad with nickel at least 0.0015 inch thick.

2. An article comprising cerium monosulfide which is clad with chromium at least 0.0015 inch thick.

3. An article comprising cerium monosulfide which is clad with zirconium at least 0.0015 inch thick.

4. An article comprising cerium monosulfide which is clad with an oxidation resistant nickel base alloy at least 0.0015 inch thick.

5. An article comprising cerium monosulfide having a supporting wire selected from the group consisting of tungsten and molybdenum through the body thereof, said article being clad with an oxidation resistant metal at least 0.0015 inch thick.

6. An article comprising cerium monosulfide having a supporting wire selected from the group consisting of tungsten and molybdenum through the body thereof, said article being clad with nickel on the surface thereof which coating is at least 0.0015 inch thick.

7. An article comprising cerium monosulfide having a supporting wire selected from the group consisting of tungsten and molybdenum through the body thereof, said article being clad with chromium on the surface thereof which coating is at least 0.0015 inch thick.

8. An article comprising cerium monosulfide having a supporting wire selected from the group consisting of tungsten and molybdenum through the body thereof, said article being clad with zirconium on the surface thereof which coating is at least 0.0015 inch thick.

9. An article comprising cerium monosulfide having a supporting wire selected from the group consisting of tungsten and molybdenum through the body thereof, said article being clad with an oxidation resistant nickel base alloy on the surface thereof which coating is at least 0.0015 inch thick.

10. An article comprising cerium monosulfide having a supporting wire selected from the group consisting of tungsten and molybdenum through the body thereof, said article being clad with an oxidation resistant heat-resistant nickel base alloy on the surface thereof which coating is at least 0.0015 inch thick.

11. An article comprising cerium monosulfide which is clad with an oxidation resistant metal selected from the group consisting of nickel, chromium, iron, cobalt, gold, zirconium, platinum, and alloys thereof so as to protect said cerium monosulfide from oxidation.

References Cited in the file of this patent

UNITED STATES PATENTS

| 2,511,472 | Kmecik | June 13, 1950 |
| 2,696,662 | Le Sech | Dec. 14, 1954 |
| 2,895,849 | Perlman | July 21, 1959 |

FOREIGN PATENTS

| 681,250 | Great Britain | Oct. 22, 1952 |

OTHER REFERENCES

Metals Handbook, pages 30 and 489, published by American Society for Metals; 8th edition, 1961 edition.